(12) United States Patent
Su

(10) Patent No.: US 8,449,164 B2
(45) Date of Patent: May 28, 2013

(54) BACKLIGHT MODULE HAVING A COMPOSITE OPTICAL FILM DISPOSED IN A NOVEL LOCATION TO PREVENT IMPROPER COLOR MIXING

(75) Inventor: Ming-Hsien Su, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 93 days.

(21) Appl. No.: 13/275,281

(22) Filed: Oct. 17, 2011

(65) Prior Publication Data

US 2012/0120678 A1    May 17, 2012

(30) Foreign Application Priority Data

Nov. 15, 2010  (TW) ................................ 99139217 A

(51) Int. Cl.
*F21V 8/00* (2006.01)
(52) U.S. Cl.
USPC ........... 362/607; 362/97.3; 362/97.4; 349/62; 349/65
(58) Field of Classification Search
CPC ..... F21V 8/00; G02F 1/33615; G02F 1/33603; H01J 61/305
USPC ...................... 362/607, 339, 561; 349/65, 62
See application file for complete search history.

(56) References Cited

U.S. PATENT DOCUMENTS

| | | | |
|---|---|---|---|
| 7,880,971 B2* | 2/2011 | Li et al. .......................... | 359/641 |
| 2008/0137005 A1* | 6/2008 | Kim ................................. | 349/64 |
| 2011/0116285 A1* | 5/2011 | Cheng et al. .................. | 362/612 |
| 2011/0157914 A1* | 6/2011 | Chang ........................... | 362/609 |

FOREIGN PATENT DOCUMENTS

TW          201024853          7/2010

* cited by examiner

*Primary Examiner* — Tracie Y Green
(74) *Attorney, Agent, or Firm* — Jianq Chyun IP Office

(57) ABSTRACT

A backlight module includes a light guide plate, a plurality of light emitting devices, and a composite optical film. The light guide plate has a light incident surface, a light exit surface, and a bottom surface, wherein the light exit surface is opposite to the bottom surface, and the light incident surface is connected with the light exit surface and the bottom surface. The light emitting devices are disposed beside the light incident surface of the light guide plate. Each of the light emitting devices has a light emitting surface facing to the light incident surface, wherein the light emitting surface provides a light beam. The composite optical film is disposed between the light emitting surface and the light incident surface and includes a diffusion layer and a partially transmissive and partially reflective layer.

20 Claims, 13 Drawing Sheets

BACKLIGHT MODULE HAVING A COMPOSITE OPTICAL FILM DISPOSED IN A NOVEL LOCATION TO PREVENT IMPROPER COLOR MIXING

CROSS-REFERENCE TO RELATED APPLICATION

This application claims the priority benefit of Taiwan application serial no. 99139217, filed on Nov. 15, 2010. The entirety of the above-mentioned patent application is hereby incorporated by reference herein and made a part of this specification.

BACKGROUND OF THE INVENTION

1. Field of the Invention

The invention generally relates to a backlight module, and in particular, to a backlight module capable of providing a plane light source having good light uniformity.

2. Description of Related Art

In a traditional backlight module, in order to provide a plane white-light source, disposition of light emitting devices beside a light incident surface of a light guide plate may be disposing a red light emitting diode (LED) device, a green LED device, and a blue LED device beside the light incident surface in sequence. Therefore, red light, green light, and blue light provided respectively by the red LED device, the green LED device, and the blue LED device are mixed, thus generating white light.

However, as a light beam provided by an LED device has a property of high light directivity, light beams generated respectively by an LED device disposed at an outermost side beside the light incident surface of the light guide plate and an adjacent other LED device may not have a good light mixing effect, thus causing a phenomenon of red shift, green shift, and blue shift to occur at a corner of a light exit surface of the light guide plate. For example, if the light emitting device at the outermost side is a red LED device, an optical field distribution of red shift correspondingly occurs at the corner of the light exit surface of the light guide plate, such that the light uniformity of a plane light source provided by the backlight module is lowered. In other words, it is necessary to improve the light uniformity of a plane white-light source provided by a backlight module employing a traditional structure.

Taiwan Patent Publication No. 201024853 discloses an LED backlight module, and the backlight module includes an LED light source, a light guide plate, and a reflective bottom plate. A groove is disposed on the light guide plate at a position corresponding to the above of the LED light source, and is provided with a semi-transmissive and semi-reflective film. In addition, part of the light emitted from the LED light source may penetrate the semi-transmissive and semi-reflective film and is then guided out by the light guide plate, and the other part of the light may be reflected by the semi-transmissive and semi-reflective film to the bottom plate for being recycled. Though this disposition may alleviate the problem of poor light uniformity of the backlight module, the part of the light that directly penetrates the semi-transmissive and semi-reflective film has a relatively centralized light intensity, and thus a relative uniform light source may not be provided. In addition, a red LED, a blue LED, and a green LED may be employed as the LED light source.

SUMMARY OF THE INVENTION

Accordingly, the invention is directed to a backlight module capable of providing a plane light source having good light uniformity.

Other objectives and advantages of the invention can be further understood from the technical features disclosed in the invention.

In order to achieve at least one of the objectives above, in an embodiment, the invention provides a backlight module including a light guide plate, a plurality of light emitting devices, and a composite optical film. The light guide plate has a light incident surface, a light exit surface, and a bottom surface, wherein the light exit surface is opposite to the bottom surface, and the light incident surface is connected with the light exit surface and the bottom surface. The light emitting devices are disposed beside the light incident surface of the light guide plate. Each of the light emitting devices has a light emitting surface facing to the light incident surface, and the light emitting surface provides a light beam. The composite optical film is disposed between the light emitting surface and the light incident surface, and includes a diffusion layer and a partially transmissive and partially reflective layer.

In an embodiment of the invention, the diffusion layer is disposed between the partially transmissive and partially reflective layer and the light incident surface. When a light beam from the light emitting surface is transmitted to the partially transmissive and partially reflective layer, part of the light beam passes through the partially transmissive and partially reflective layer and is diffused by the diffusion layer to the light incident surface, and part of the light beam is reflected by the partially transmissive and partially reflective layer.

In an embodiment of the invention, the partially transmissive and partially reflective layer is disposed between the diffusion layer and the light incident surface. After a light beam from the light emitting surface passes through the diffusion layer, part of the light beam passes through the partially transmissive and partially reflective layer and is transmitted to the light incident surface, and part of the light beam is reflected by the partially transmissive and partially reflective layer, and transmitted back to the diffusion layer.

In an embodiment of the invention, the composite optical film covers an end of the light incident surface of the light guide plate.

In an embodiment of the invention, the composite optical film covers the entire light incident surface of the light guide plate.

In an embodiment of the invention, the diffusion layer includes a plurality of diffusion particles, and a light beam is diffused by the particles when passing through the diffusion layer.

In an embodiment of the invention, the partially transmissive and partially reflective layer includes a plurality of reflection particles, and when a light beam is transmitted to the partially transmissive and partially reflective layer, part of the light beam is reflected by the reflection particles, and part of the light beam passes through the partially transmissive and partially reflective layer via a gap between the reflection particles.

In an embodiment of the invention, the backlight module further includes a substrate and a reflective device, wherein the reflective device and the light emitting devices are disposed on the substrate, and the reflective device is located peripherally to the light emitting devices.

In an embodiment of the invention, the substrate has a device disposition surface, facing to the light incident surface of the light guide plate, and the light emitting devices are disposed on the device disposition face of the substrate.

In an embodiment of the invention, the substrate has a device disposition surface, vertical to the light incident surface of the light guide plate, and the light emitting devices are disposed on the device disposition surface of the substrate.

In an embodiment of the invention, the light emitting devices include at least one of a red LED device, a green LED device, a blue LED device, and a white LED device.

In an embodiment of the invention, the backlight module further includes a plurality of light scattering micro-structures, disposed on the bottom surface or the light exit surface of the light guide plate.

In an embodiment of the invention, a density of the light scattering micro-structures located on the bottom surface or the light exit surface of the light guide plate is gradually thickened in a direction away from the light incident surface.

In an embodiment of the invention, the light scattering micro-structures are evenly aligned on the bottom surface or the light exit surface of the light guide plate.

In an embodiment of the invention, the light guide plate has a thickness gradually thinned in a direction away from the light incident surface. In an embodiment of the invention, the light guide plate is a wedge-shaped light guide plate.

In an embodiment of the invention, the backlight module further includes a reflective sheet, disposed on the bottom surface of the light guide plate.

In an embodiment of the invention, the backlight module further includes an optical film assembly, disposed on the light exit surface, and including at least one of a diffusion sheet, a prism sheet, and a brightness-enhanced sheet.

In an embodiment of the invention, the composite optical film includes a plurality of diffusion layers and a plurality of partially transmissive and partially reflective layers, wherein one of the diffusion layers is closest to the light incident surface of the light guide plate.

In an embodiment of the invention, the composite optical film includes a plurality of diffusion layers and a plurality of partially transmissive and partially reflective layers, wherein one of the partially transmissive and partially reflective layers is closest to the light incident surface of the light guide plate.

Based on the above, in the backlight module of the invention, the composite optical film is disposed between the light emitting devices and the light incident surface of the light guide plate, wherein the composite optical film includes the diffusion layer and the partially transmissive and partially reflective layer. As such, a light beam with a relatively centrally distributed light intensity provided by the light emitting device may exhibit a relatively dispersed and even optical field distribution after passing through the composite optical film. In other words, after the light beam provided by the light emitting device enters into the light guide plate and exits from the light exit surface of the light guide plate, the backlight module may appear as a plane light source having good light uniformity.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
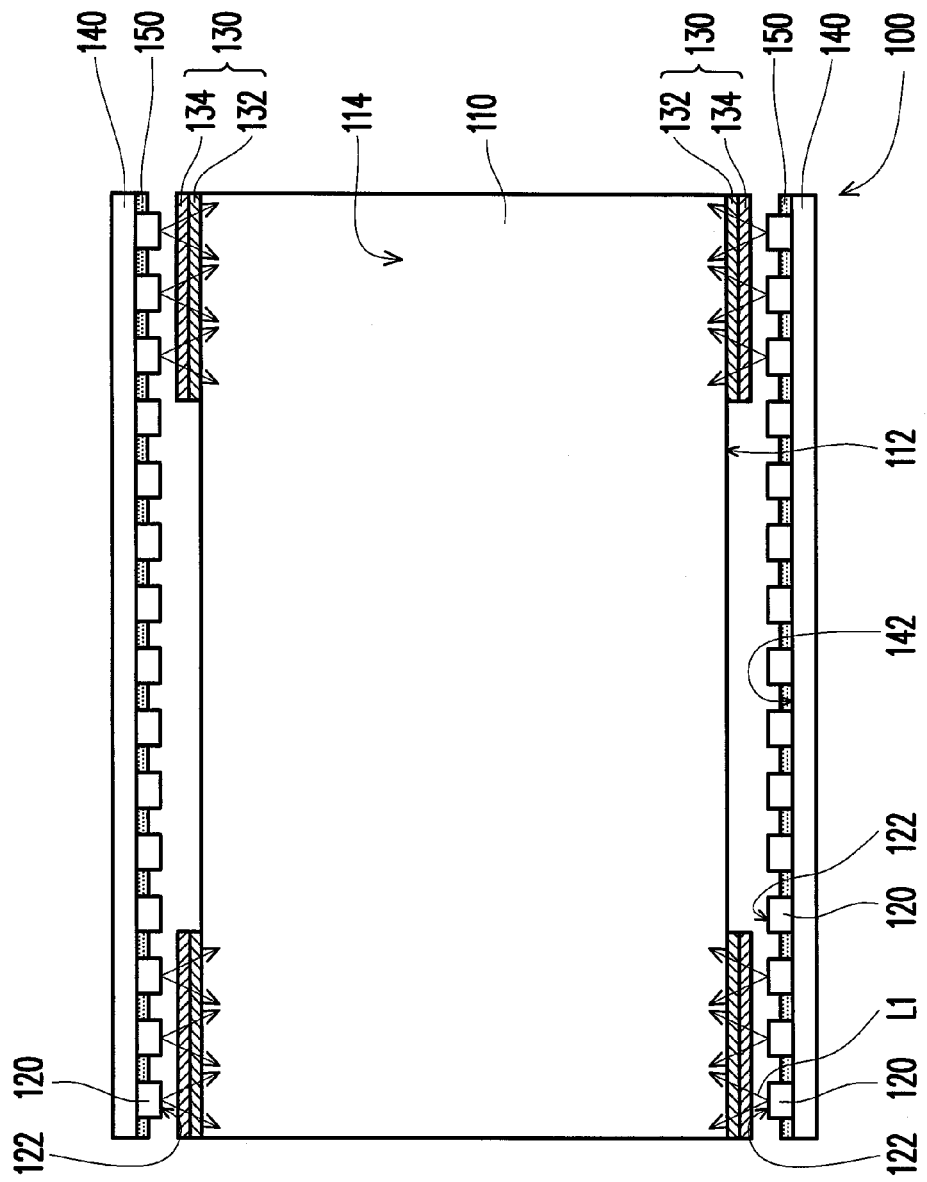
FIG. 1A is a schematic top view of a backlight module according to an embodiment of the invention.
Figure 1B:
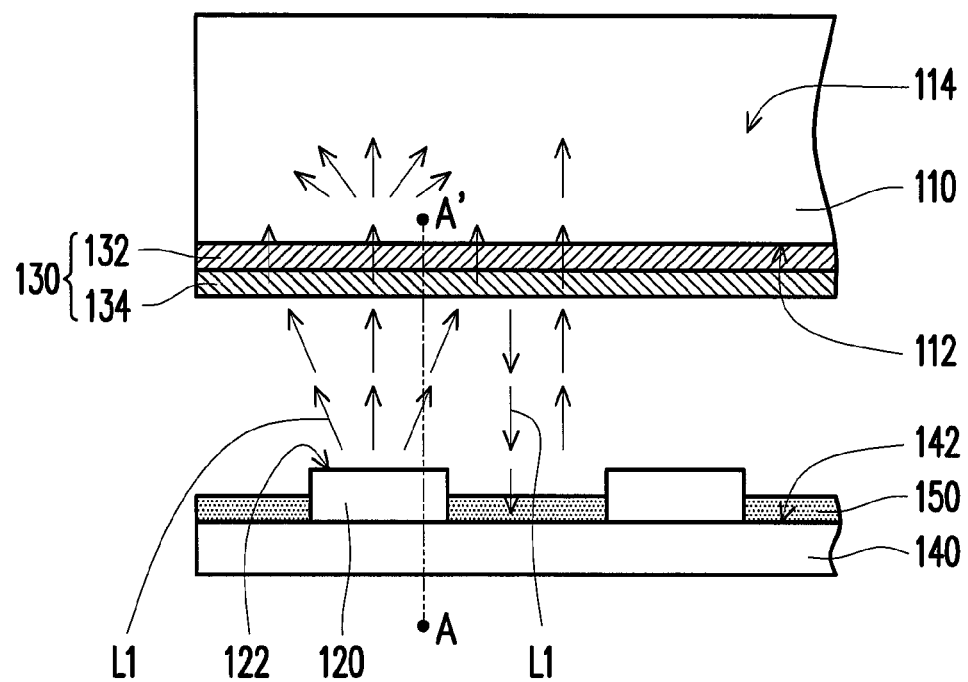
FIG. 1B is a partial enlarged view of FIG. 1A.
Figure 1C:
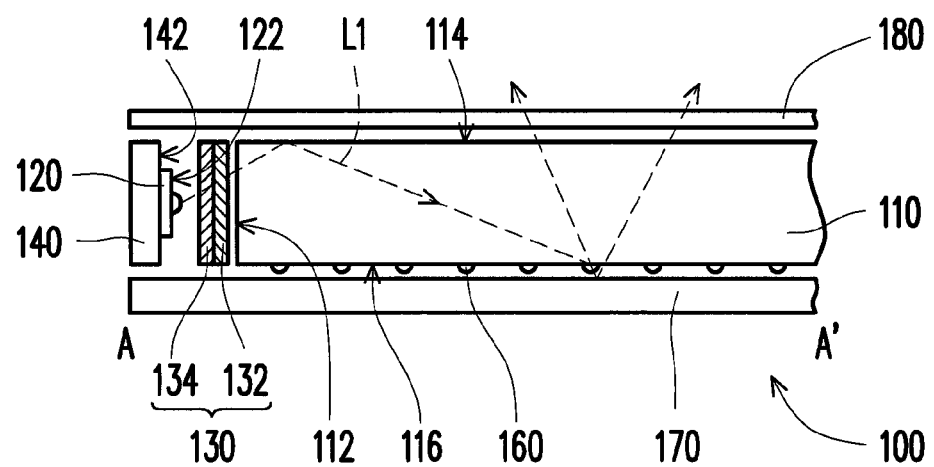
FIG. 1C is a schematic cross-sectional view of the backlight module as shown in FIG. 1B along line AA'.

Referring to FIGS. 1A, 1B, and 1C, in this embodiment, a backlight module 100 includes a light guide plate 110, a plurality of light emitting devices 120, and a composite optical film 130. The light guide plate 110 has a light incident surface 112, a light exit surface 114, and a bottom surface 116, wherein the light exit surface 114 is opposite to the bottom surface 116, and the light incident surface 112 is connected with the light exit surface 114 and the bottom surface 116. In the embodiment, the light guide plate 110 is described with a flat light guide plate as shown in FIG. 1C as an example; however, the invention is not limited thereto. The light guide plate 110 may also employ other possible light guide structures, and this is described in subsequent paragraphs with reference to examples.

In addition, the light emitting devices 120 are disposed beside the light incident surface 112 of the light guide plate 110. Each of the light emitting devices 120 has a light emitting surface 122 facing to the light incident surface 112, wherein the light emitting surface 122 provides a light beam L1, as shown in FIGS. 1A, 1B, and 1C. In the embodiment, the light emitting devices 120 may be a red LED device, a green LED device, a blue LED device, or a white LED device.

Figure 1D:
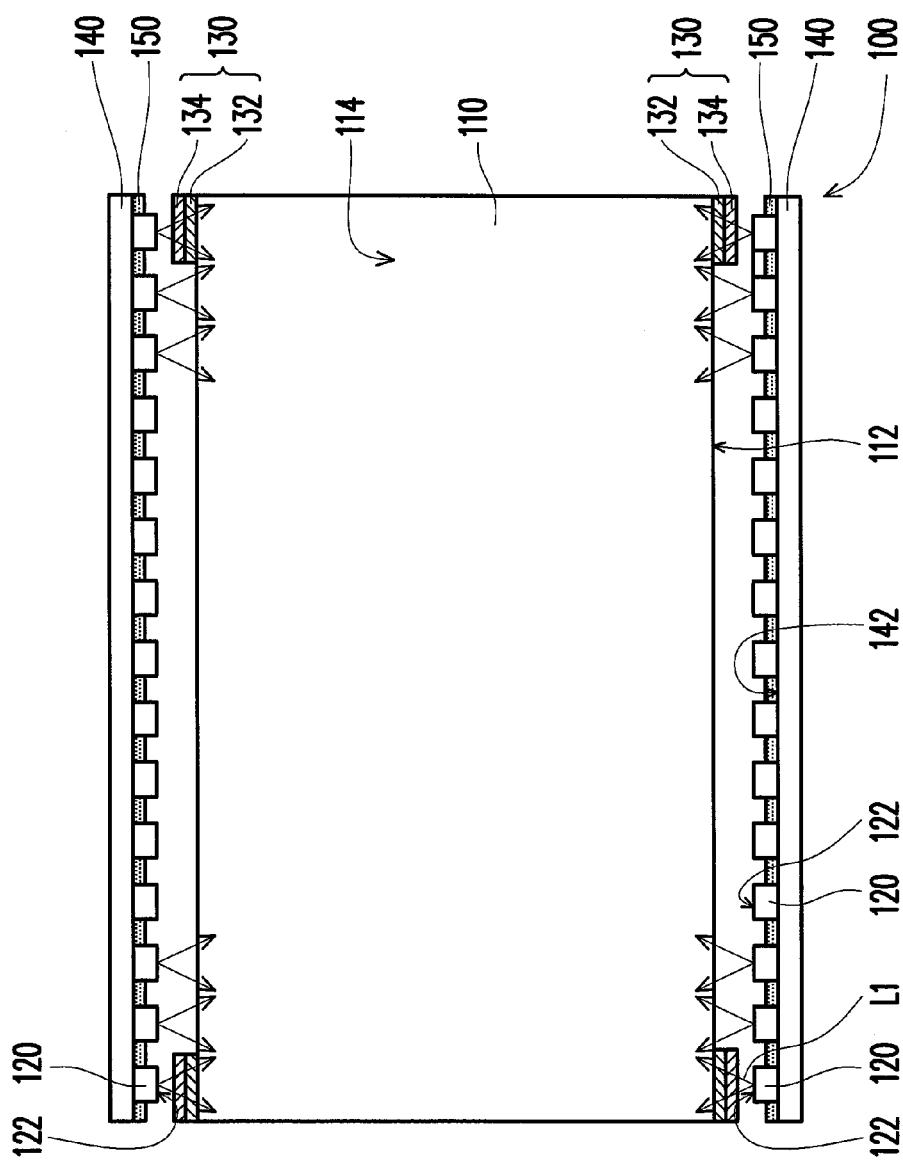
FIG. 1D is a schematic top view of a backlight module according to another embodiment of the invention.
Figure 1E:
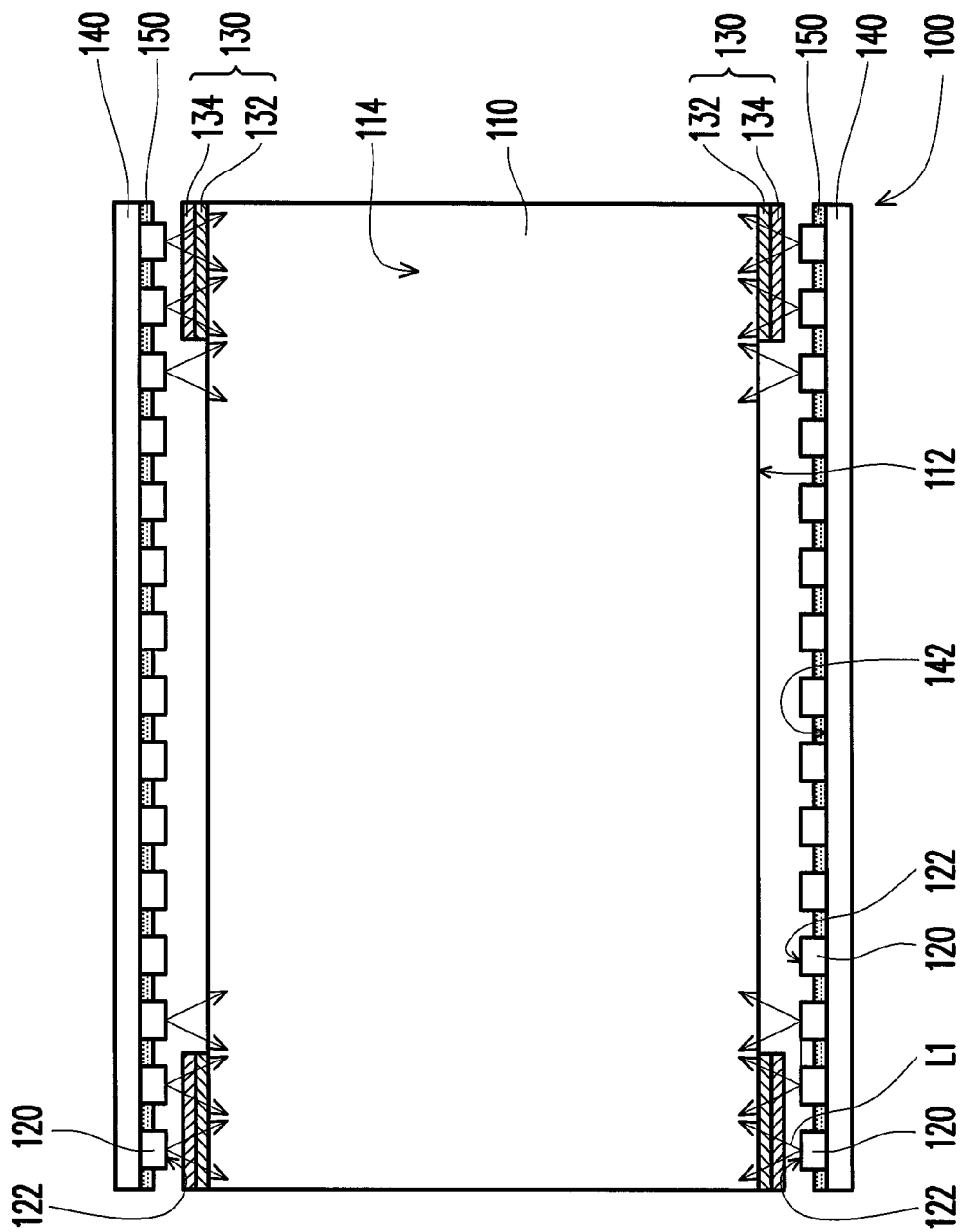
FIG. 1E is a schematic top view of a backlight module according to another embodiment of the invention.

In order to solve the problem of poor light mixing effect of a conventional backlight module and improve the light uniformity of a plane light source provided by the backlight module 100, in the backlight module 100 according to the embodiment, the composite optical film 130 is disposed between the light emitting surface 122 and the light incident surface 112. The embodiment is described with the composite optical film 130 disposed between outermost three light emitting devices 120 and the light incident surface 112 as an example, wherein the composite optical film 130 includes a diffusion layer 132 and a partially transmissive and partially reflective layer 134. As such, after the light beams L1 provided by the light emitting devices 120 pass through the composite optical film 130, part of the light beams L1 is reflected, and part of the light beams L1 is diffused, and thus a previous optical field distribution of the light beam L1 with relatively centralized light intensity and emitted from the light emitting surface 122 is changed, and a relative dispersed and even optical field distribution is exhibited. In another embodiment, the composite optical film 130 may also be disposed between the outermost one light emitting device 120 and the light incident surface 112, as shown in FIG. 1D. After the light beam L1 provided by the outermost light emitting device 120 passes through the composite optical film 130, an optical field distribution of the light beam L1 is changed, and thus the previous light beam L1 closest to the outermost side of the light guide plate 110 and incapable of being mixed is improved, wherein the light emitting devices 120 may be a red LED or a green LED. In another embodiment, the composite optical film 130 is disposed between the outermost two light emitting devices 120 and the light incident surface 112, as shown in FIG. 1E. After the light beams L1 provided by the outermost two light emitting devices 120 pass through the composite optical film 130, a good light mixing effect is also achieved, wherein the light emitting devices may be a red LED and a green LED. To sum up, after the light beam L1 provided by the outermost light emitting device 120 enters into the light guide plate 110 and exits from the light exit surface 114 of the light guide plate 110, a color shift problem occurred at a corner of the light guide plate 110 is eliminated and the light uniformity of the plane light source provided by the backlight module 100 is improved. Detailed descriptions are given below.

In this embodiment, the backlight module 100 further includes a substrate 140 and a reflective device 150, wherein the reflective device 150 and the light emitting devices 120 are disposed on the substrate 140, and the reflective device 150 is located peripherally to the light emitting devices 120, as shown in FIGS. 1A, 1B, and 1C. In the embodiment, the substrate 140 has a device disposition surface 142, facing to the light incident surface 112 of the light guide plate 110, and the light emitting devices 120 are disposed on the device disposition surface 142 of the substrate 140. Moreover, the diffusion layer 132 of the composite optical film 130 is disposed between the partially transmissive and partially reflective layer 134 and the light incident surface 112.

Specifically, when the light beam L1 from the light emitting surface 122 is transmitted to the partially transmissive and partially reflective layer 134, part of the light beam L1 passes through the partially transmissive and partially reflective layer 134 first and is then diffused by the diffusion layer 132 to the light incident surface 112, and part of the light beam L1 is reflected by the partially transmissive and partially reflective layer 134, and transmitted to the substrate 140, as shown in FIG. 1B. As the reflective device 150 is disposed on the substrate 140, the light beam L1 is reflected by the reflective device 150 and then re-transmitted back to the partially transmissive and partially reflective layer 134. Likewise, the light beam L1 re-transmitted back to the partially transmissive and partially reflective layer 134 is also partially reflected and partially passes through. With such a recycle, in addition to the improvement of the opportunity of the light beam L1 entering into the light guide plate 110 and the improvement of the light utilization, the optical field distribution of the light beam L1 having high directivity and provided by the light emitting device 120 is effectively dispersed and evened before entering into the light guide plate 110. As such, after the light beam L1 provided by the light emitting device 120 enters into the light guide plate 110 and exits from the light exit surface 114 of the light guide plate 110, the overall light uniformity of the plane light source provided by the backlight module 100 is good.

Figure 1F:
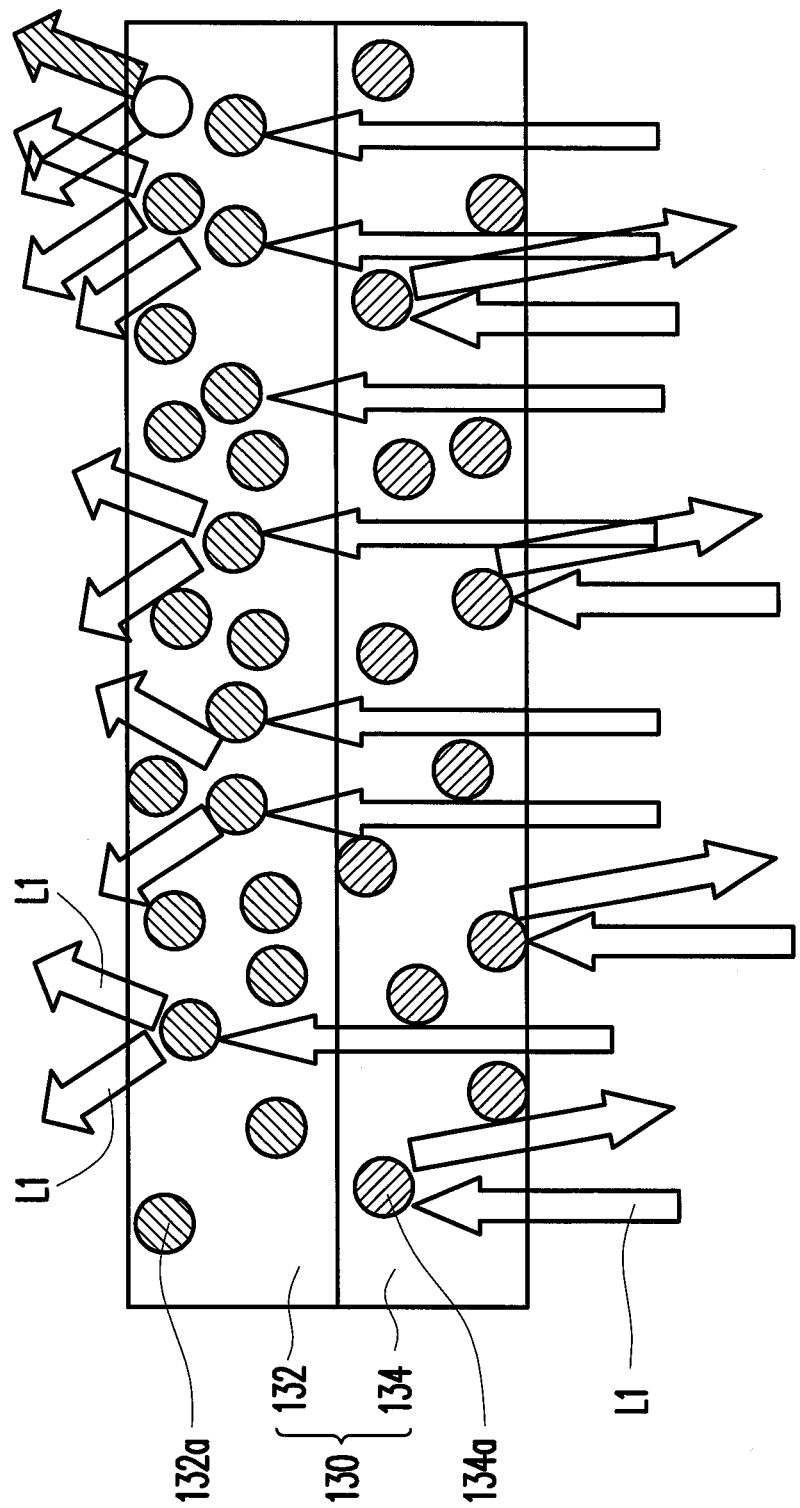
FIG. 1F is a schematic view of an optical mechanism of a light beam entering into a composite optical film of the invention.

In addition, an implementation aspect as shown in FIG. 1F shows a specific optical mechanism of the composite optical film 130 according to the embodiment diffuses and reflects the light beam L1. Specifically, the partially transmissive and partially reflective layer 134 may include a plurality of reflection particles 134a located therein or on a surface thereof, and this embodiment is described with the reflection particles 134a located in the partially transmissive and partially reflective layer 134 as an example. Since the reflection particles 134a are located in the partially transmissive and partially reflective layer 134, part of the light beam L1 from the light emitting device 120 is reflected by the reflection particles 134a and transmitted back to the substrate 140 when the light beam L1 is transmitted to the partially transmissive and partially reflective layer 134, and part of the light beam L1 passes through the partially transmissive and partially reflective layer 134 via a gap between the reflection particles 134a, and is transmitted to the diffusion layer 132. In the embodiment, the diffusion layer 132 may include a plurality of diffusion particles 132a located therein or on a surface thereof. Therefore, when passing through the diffusion layer 132, the part of the light beam L1 passing though the partially transmissive and partially reflective layer 134 is diffused by the diffusion particles 132a and transmitted to the light incident surface 112 of the light guide plate 110, and then enters into the light guide plate 110, as shown in FIGS. 1B and 1F. It should be noted that, in the embodiment, the light beam L1 with relatively centralized light intensity is partially reflected by and partially passes through the partially transmissive and partially reflective layer 134. The partially reflected light beam L1 may be reflected by the reflective device 150 on the substrate 140 back to the partially transmissive and partially reflective layer 134 for being recycled, and the light beam L1 partially passed through and the recycled light beam L1 from the reflective device 150 may be further diffused by the diffusion particles 132*a* of the diffusion layer 132, thereby a relatively dispersed and even optical field distribution may be provided.

In the embodiment, the backlight module 100 further includes a plurality of light scattering micro-structures 160 disposed on the bottom surface 116 or the light exit surface 114 of the light guide plate 110, and a reflective sheet 170 disposed on the bottom surface 116 of the light guide plate 110, as shown in FIG. 1C. Specifically, part of the light beam L1 may be incident to the light exit surface 114 at an incident angle less than a critical angle through the light scattering micro-structures 160 after the light beam L1 enters into the light guide plate 110, and thus passes through the light exit surface 114, and is transmitted outside of the backlight module 100. In addition, in the embodiment, the other part of the light beam L1 is transmitted to the reflective sheet 170 disposed on the bottom surface 116 with the scattering effect of the light scattering micro-structures 160. The reflective sheet 170 reflects the light beam L1, and the light beam L1 penetrates the bottom surface 116 and the light exit surface 114 in sequence, and is transmitted outside of the backlight module 100, such that the light utilization may be effectively improved, and the backlight module 100 may provide a plane light source with good light intensity.

In the embodiment, the light scattering micro-structures 160 are evenly aligned on the bottom surface 116 or the light exit surface 114 of the light guide plate 110. As shown in FIG. 1C, this embodiment is described with the light scattering micro-structures 160 disposed on the bottom surface 116 of the light guide plate 110 as an example; however, the invention is not limited thereto. In another embodiment not shown, a density of the light scattering micro-structures 160 located on the light guide plate 110 is gradually thickened in a direction away from the light incident surface 112.

In addition, in order to further control the intensity distribution and uniformity of the light beam L1 exiting from the light exit surface 114, in the embodiment, the backlight module 100 employs an optical film assembly 180 disposed on the light exit surface 114. In the embodiment, the optical film assembly 180 includes at least one of a diffusion sheet, a prism sheet, and a brightness-enhanced sheet. The light beam L1 achieves a light uniformization effect after passing through the diffusion sheet, and achieves an effect of converging a light exit angle after passing through the prism sheet and the brightness-enhanced sheet. In addition, in other embodiment, the optical film included in the optical film assembly 180 may also be other optical film having suitable micro structure.

Figure 2:
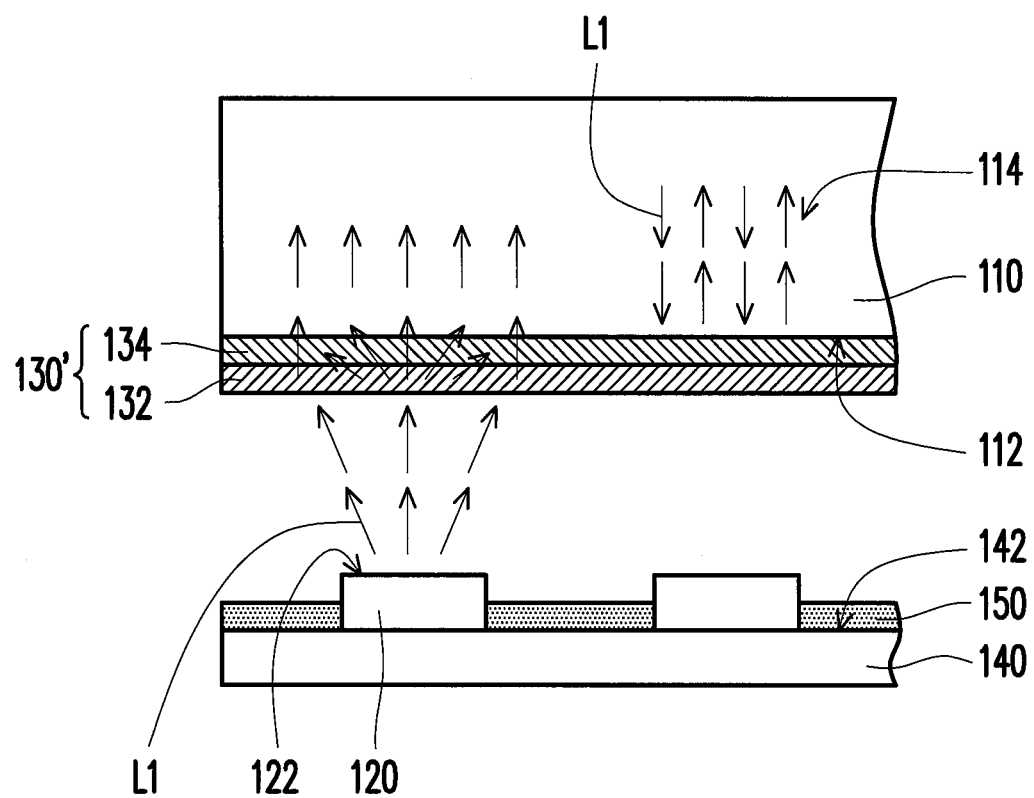
FIG. 2 is a schematic top view of a backlight module according to another embodiment of the invention.

In another embodiment, the composite optical film 130 as shown in FIG. 1A may also employ a composite optical film 130' as shown in FIG. 2. Specifically, in the composite optical film 130', the partially transmissive and partially reflective layer 134 is disposed between the diffusion layer 132 and the light incident surface 112, as shown in FIG. 2. As such, the light beam L1 from the light emitting surface 122 is transmitted to the diffusion layer 132 first, and is diffused by the diffusion layer 132 when passing through the diffusion layer 132, and transmitted to the partially transmissive and partially reflective layer 134, wherein part of the light beam L1 passes through the partially transmissive and partially reflective layer 134, and is transmitted to the light incident surface 112, and part of the light beam L1 is reflected by the partially transmissive and partially reflective layer 134, and transmitted back to the diffusion layer 132. Likewise, as the reflective device 150 is disposed on the substrate 140, the light beam L1 may be reflected by the reflective device 150 and re-transmitted back to the composite optical film 130' when part of the light beam L1 is emitted out of the diffusion layer 132 and transmitted to the substrate 140.

It should be noted that as the partially transmissive and partially reflective layer 134 is disposed beside the light incident surface 112 of the light guide plate 110, part of the light beam L1 reflected by the light scattering micro-structures 160 and transmitted back to the light incident surface 112 is re-reflected by the partially transmissive and partially reflective layer 134 and re-transmitted back into the light guide plate 110, such that the light utilization and the overall light emitting efficiency of the backlight module 100 may be improved, as shown in FIG. 2. Likewise, the light beam L1 provided by the light emitting device 120 at an opposite side may also be reflected by the partially transmissive and partially reflective layer 134 and re-transmitted back into the light guide plate 110, such that the light utilization and the overall light emitting efficiency of the backlight module 100 may be further improved.

In addition, the implementation aspects as shown in FIGS. 1A to 1F and 2 are all described with the composite optical films 130, and 130' covering an end of the light incident surface 112 of the light guide plate 110. In this way, a poor light uniformity, for example, red shift, green shift, or blue shift, occurred at a corner of the light exit surface 114 of the light guide plate 110 is solved, and the light uniformity of the plane light source provided by the backlight module 100 is improved, while the fabrication cost is effectively saved. If permitted by the preparation cost, a composite optical film 230 may also cover the entire light incident surface 112 of the light guide plate 110, for example, backlight modules 200*a* and 200*b* respectively shown in FIGS. 3A and 3B.

Figure 3A:
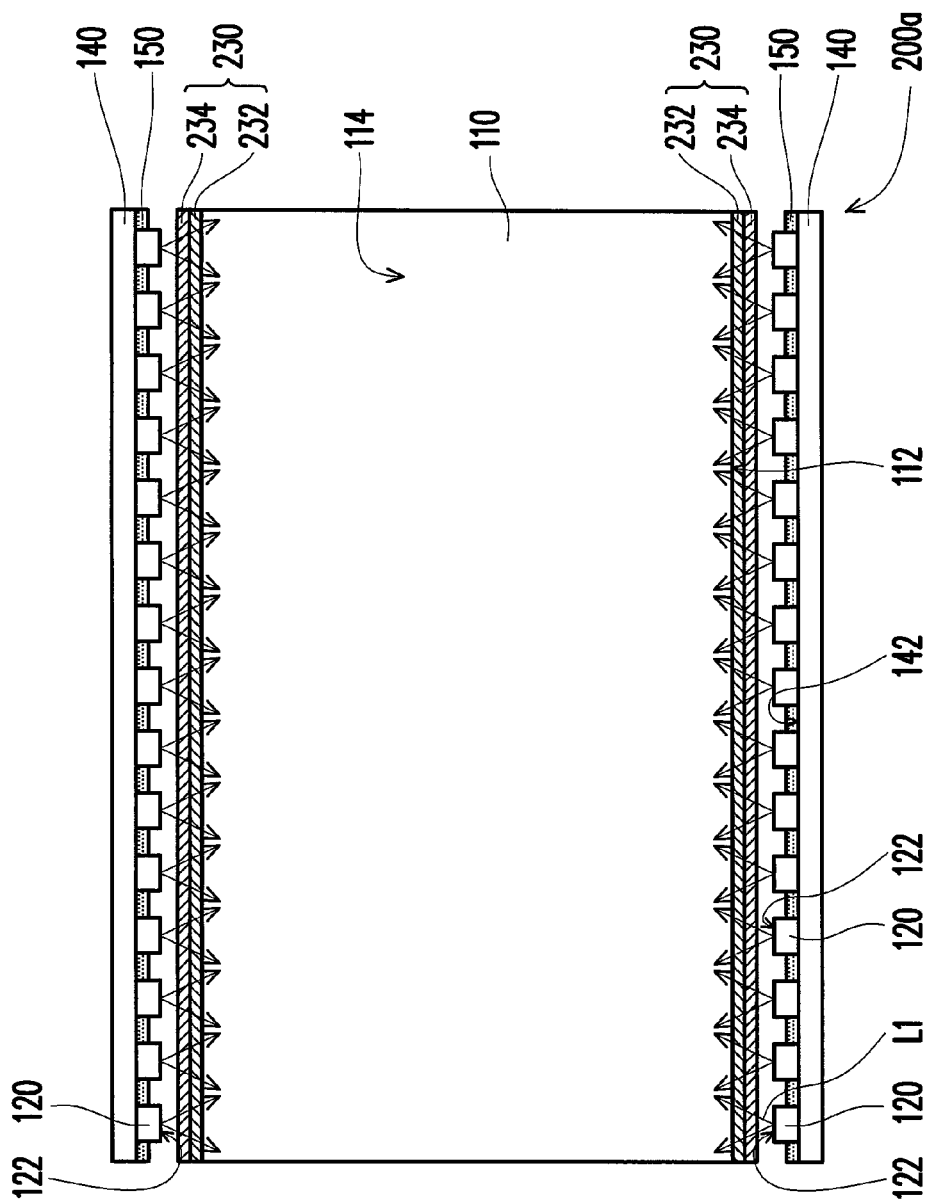
FIGS. 3A and 3B are respectively a schematic top view of a backlight module wherein a composite optical film covers an entire light guide plate.

Referring to FIGS. 1A and 3A first, in the embodiment, the backlight module 200*a* is similar to the backlight module 100, and the differences between the backlight module 200*a* and the backlight module 100 are described below. In the backlight module 200*a* according to the embodiment, the composite optical film 230 includes a diffusion layer 232 and a partially transmissive and partially reflective layer 234, and the composite optical film 230 covers the entire light incident surface 112 of the light guide plate 110, as shown in 3A. Therefore, the backlight module 200*a* according to the embodiment may solve the poor light uniformity occurred at a corner of the light exit surface 114 of the light guide plate 110, and also make the light uniformity at everywhere of the light exit surface 114 of the light guide plate 110 more even. Furthermore, as the backlight module 200*a* according to the embodiment employs the same idea as that of the backlight module 100, the backlight module 200*a* also has the advantages mentioned for the backlight module 100, and is not described in detail here again.

Figure 3B:
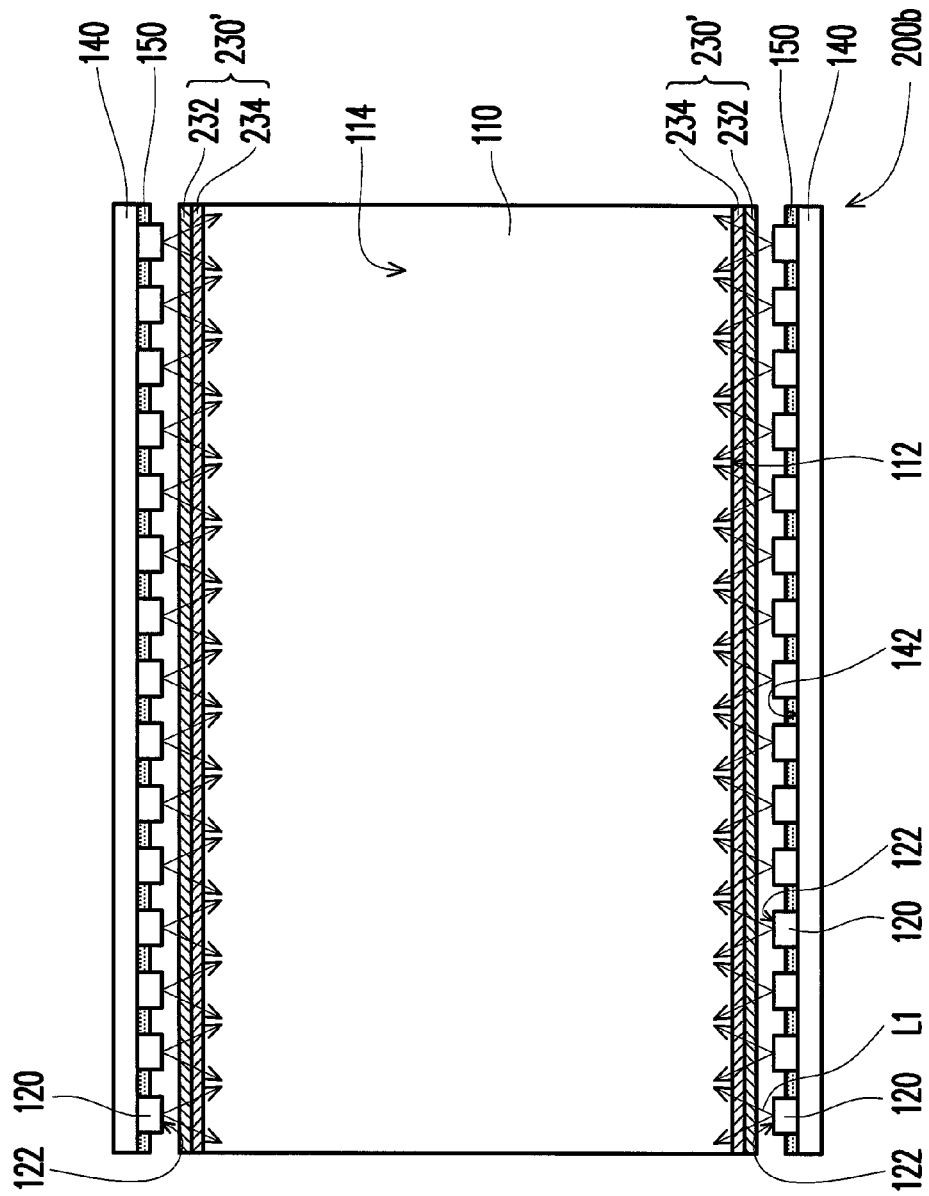

Next, referring to FIGS. 3A and 3B, the backlight module 200*b* according to the embodiment is similar to the backlight module 200*a*, and the differences between the backlight module 200*b* and the backlight module 200*a* are described below. In the backlight module 200*b* according to the embodiment, the composite optical film 230' includes the diffusion layer 232 and the partially transmissive and partially reflective layer 234, and the partially transmissive and partially reflective layer 234 is disposed between the diffusion layer 232 and the light incident surface 112, as shown in FIG. 3B. Similarly, as the composite optical film 230' employs the same idea and structure mentioned for the composite optical film 130', the composite optical film 230' also has the effects and advantages mentioned for the composite optical film 130'. Moreover, the backlight module 200b according to the embodiment may solve the poor light uniformity occurred at a corner of the light exit surface 114 of the light guide plate 110, and also make the light uniformity at everywhere of the light exit surface 114 of the light guide plate 110 more even. Furthermore, as the backlight module 200b according to the embodiment employs the same idea as that of the backlight module 200a and the embodiment as shown in FIG. 2, the backlight module 200b also has the advantages mentioned for the backlight module 200a, and is not described in detail here again.

Figure 4A:
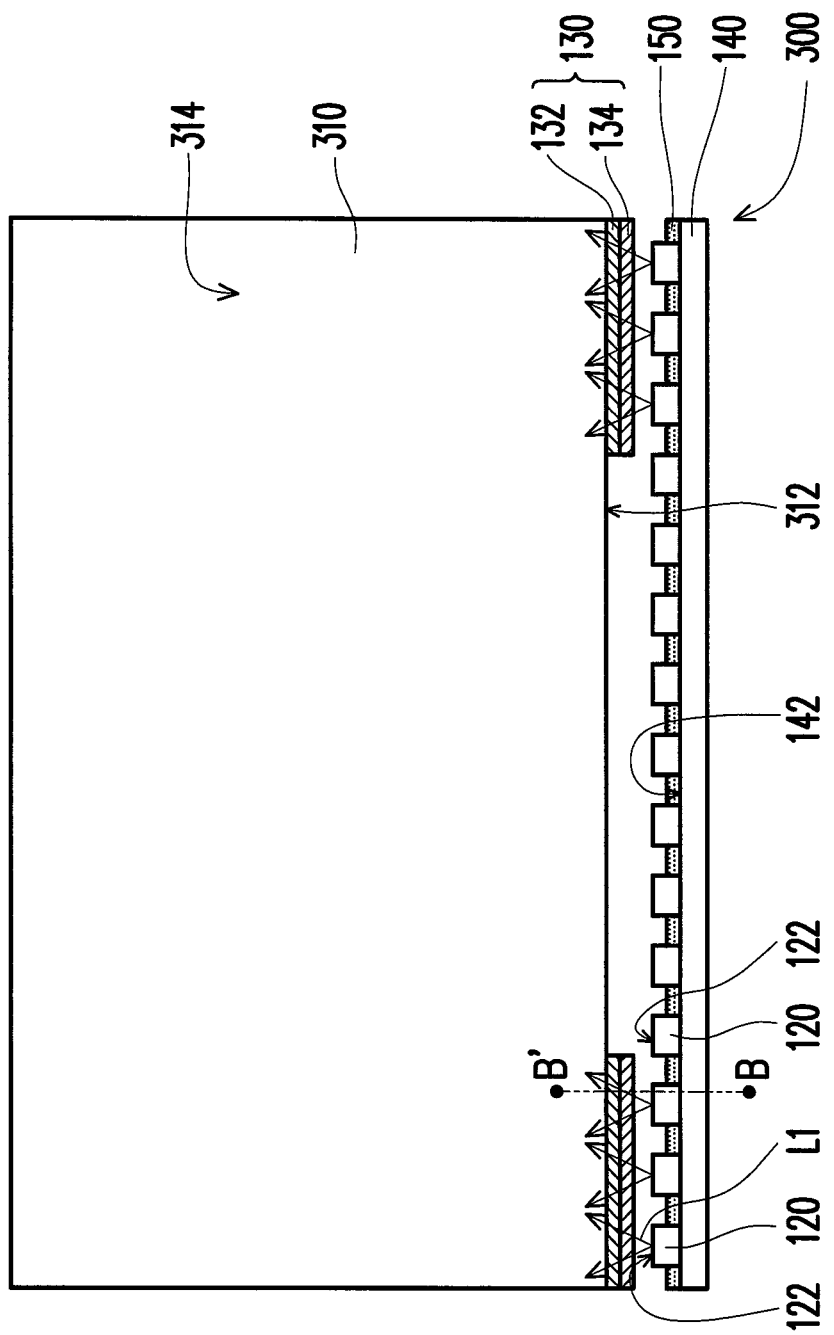
FIG. 4A is a schematic top view of a backlight module according to another embodiment of the invention.
Figure 4B:
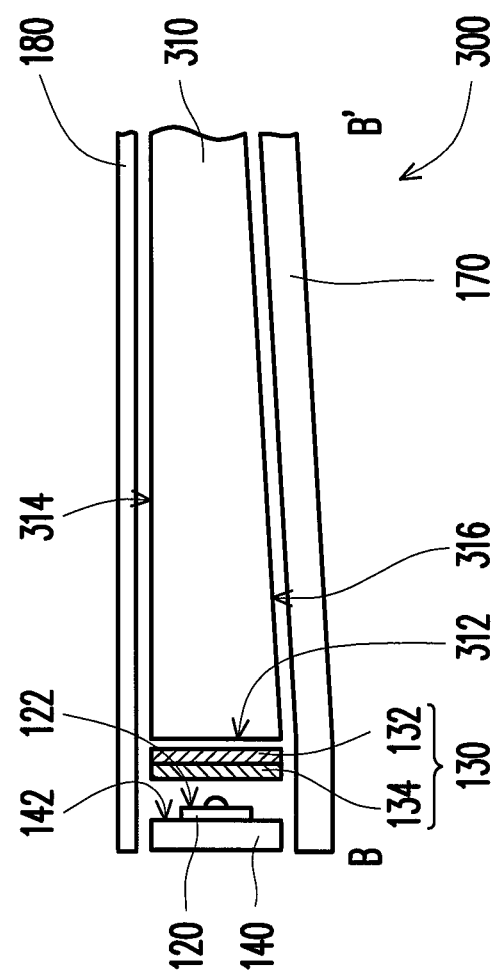
FIG. 4B is a schematic cross-sectional view of the backlight module as shown in FIG. 4A along line BB'.

Referring to FIGS. 4A and 4B, a backlight module 300 according to the embodiment has a structure and an idea similar to the backlight module 100, and the differences between the backlight module 300 and the backlight module 100 are described below. In the backlight module 300 according to the embodiment, a light guide plate 310 has a thickness gradually thinned in a direction away from a light incident surface 312, as shown in FIG. 4B. In the embodiment, the light guide plate 310 is a wedge-shaped light guide plate. It should be noted that as the light guide plate 310 employs an ideal and a principle of a structure of a wedge-shaped light guide plate, the backlight module 300 according to the embodiment does not employ the design of the light scattering micro-structures 160. In addition, the wedge-shaped structure of the light guide plate 310 according to the embodiment may also be applied in the backlight modules 100, 200a, and 200b.

It should be noted that the composite optical films 130', 230, and 230' may also be applied in the backlight module 300 according to the embodiment, such that the backlight module 300 has the above advantages, and is not described in detail here again.

Figure 5:
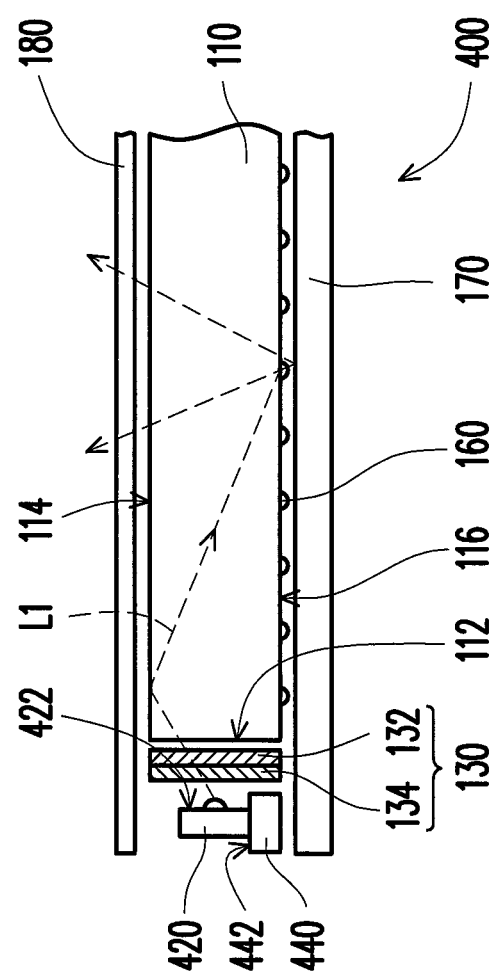
FIG. 5 is a schematic cross-sectional view of another embodiment of a plane light source module as shown in FIG. 1A along line AA'.

Referring to FIGS. 5 and 1C, a backlight module 400 according to the embodiment has a structure and an idea similar to the backlight module 100, and the differences between the backlight module 400 and the backlight module 100 are described below. In the backlight module 400 according to the embodiment, a substrate 440 has a device disposition surface 442, vertical to the light incident surface 112 of the light guide plate 110, and light emitting devices 420 are disposed on the device disposition surface 442 of the substrate 440. In the embodiment, the light emitting surface 422 of the light emitting device 420 faces to the light incident surface 112 of the light guide plate 110, and provides the light beam L1. Specifically, in the backlight module 400, unlike the light emitting devices 120 employing a structure of top LED devices, the light emitting devices 420 according to the embodiment employ lateral illuminating LED devices, and thus the device disposition surface 442 of the substrate 440 is vertical to the light incident surface 112 of the light guide plate 110, as long as the light emitting surface 422 faces to the light incident surface 112 of the light guide plate 110, as shown in FIG. 5. In addition, the substrate 440 and the light emitting devices 420 located on the substrate 440 according to the embodiment may also be applied in the backlight modules 100, 200a, 200b, and 300.

Figure 6A:
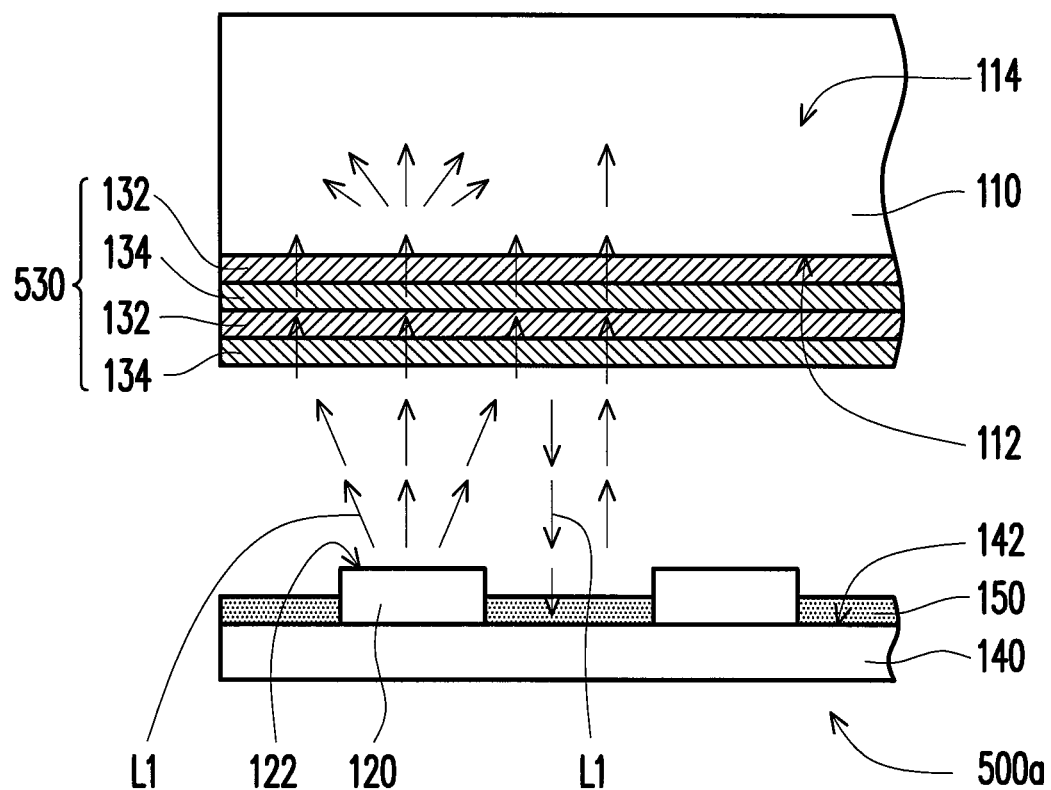
FIG. 6A is a partial enlarged top view of a backlight module according to another embodiment of the invention.

Referring to FIGS. 6A and 1B, a backlight module 500a according to the embodiment has a structure and an idea similar to the backlight module 100, and the differences between the backlight module 500a and the backlight module 100 are described below. In the backlight module 500a according to the embodiment, a composite optical film 530 may include a plurality of diffusion layers 132 and a plurality of partially transmissive and partially reflective layers 134, and the diffusion layers 132 and the partially transmissive and partially reflective layers 134 are disposed by overlapping in sequence, wherein the diffusion layers 132 are close to the light incident surface 112 of the light guide plate 110, as shown in FIG. 6A. In the embodiment, as the composite optical film 530 has the diffusion layers 132 and the partially transmissive and partially reflective layers 134, the composite optical film 530 also has the optical mechanism and advantages as described above, and thus the backlight module 500a has the advantages mentioned for the backlight module 100. It should be noted that the composite optical film 530 having the plurality of diffusion layers 132 and the plurality of partially transmissive and partially reflective layers 134 may also be applied or combined in the backlight modules 200a, 300, and 400.

Figure 6B:
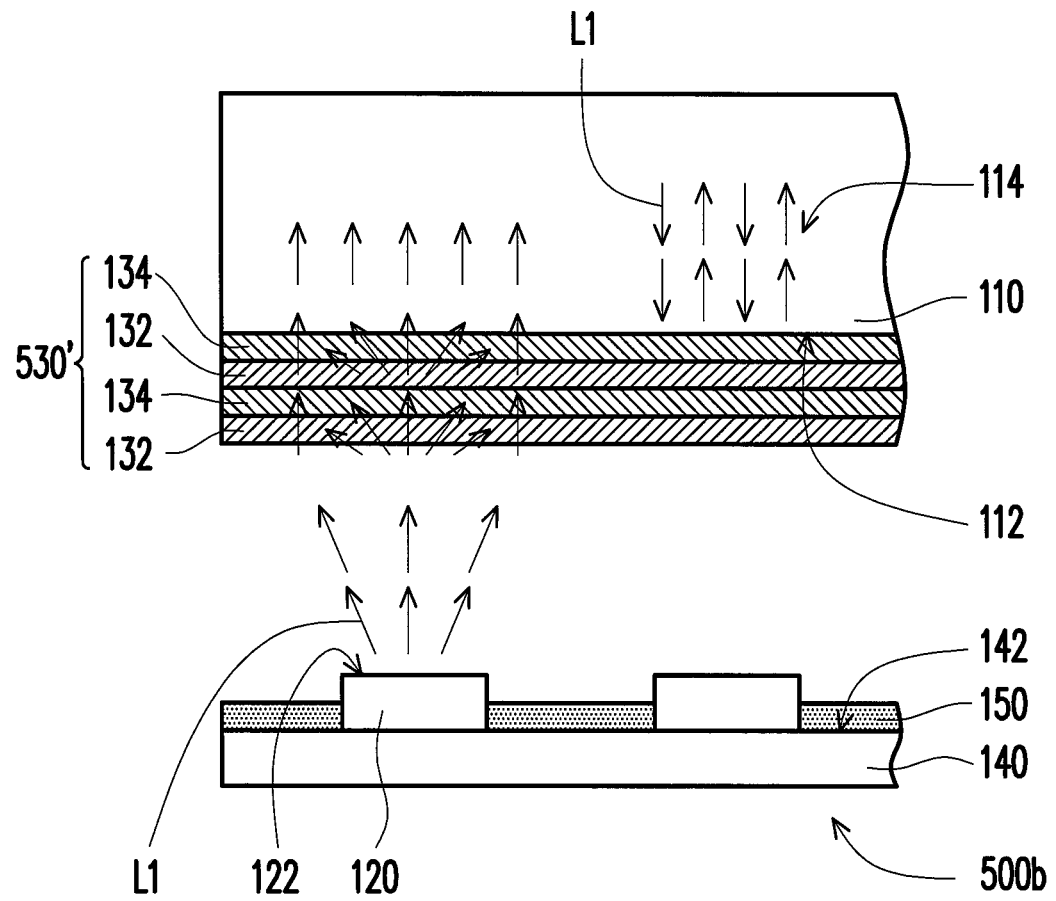
FIG. 6B is a partial enlarged top view of a backlight module according to another embodiment of the invention.

Referring to FIGS. 6B and 6A, a backlight module 500b according to this embodiment has a structure and an idea similar to the backlight module 100, and the differences between the backlight module 500b and the backlight module 500a are described below. In the backlight module 500b according to the embodiment, a composite optical film 530' may include a plurality of diffusion layers 132 and a plurality of partially transmissive and partially reflective layers 134, and the diffusion layers 132 and the partially transmissive and partially reflective layers 134 are disposed by overlapping in sequence, wherein the partially transmissive and partially reflective layers 134 are close to the light incident surface 112 of the light guide plate 110, as shown in FIG. 6B. In the embodiment, as the composite optical film 530' has the diffusion layers 132 and the partially transmissive and partially reflective layers 134, and the partially transmissive and partially reflective layers 134 are close to the light incident surface 112 of the light guide plate 110, the composite optical film 530' may also have the optical mechanism and advantages as described in FIG. 2, and thus the backlight module 500b has the advantages mentioned for the backlight module 100. It should be noted that the composite optical film 530' having the plurality of diffusion layers 132 and the plurality of partially transmissive and partially reflective layers 134 may also be applied or combined in the backlight modules 100, 200b, 300, and 400.

To sum up, the backlight module of the invention has at least one of the following advantages. In the embodiment, the composite optical film is disposed between the light emitting devices and the light incident surface of the light guide plate, wherein the composite optical film includes the diffusion layer and the partially transmissive and partially reflective layer. As such, part of the light beam is reflected by the partially transmissive and partially reflective layer when the light beam provided by the light emitting device is transmitted to the partially transmissive and partially reflective layer of the composite optical film, and part of the light beam passes through the partially transmissive and partially reflective layer. In addition, when the light beam is transmitted to the partially transmissive and partially reflective layer of the composite optical film, part of the light beam is diffused. Therefore, the light beam emitted from the light emitting surface and having an optical field distribution with relatively centralized light intensity exhibits a relatively dispersed and even optical field distribution after passing through the optical film. In other words, the backlight module appears as a plane light source having good light uniformity after the light beam provided by the light emitting devices enters into the light guide plate and exits from the light exit surface of the light guide plate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising:
a light guide plate, having a light incident surface, a light exit surface, and a bottom surface, wherein the light exit surface is opposite to the bottom surface, and the light incident surface is connected with the light exit surface and the bottom surface;
a plurality of light emitting devices, disposed beside the light incident surface of the light guide plate, wherein each of the light emitting devices has a light emitting surface facing to the light incident surface, and the light emitting surface capable of provides a light beam; and
a composite optical film, disposed between the light emitting surface and the light incident surface and comprising a diffusion layer and a partially transmissive and partially reflective layer.

2. The backlight module according to claim 1, wherein the diffusion layer is disposed between the partially transmissive and partially reflective layer and the light incident surface; and part of the light beam passes through the partially transmissive and partially reflective layer and is diffused by the diffusion layer to the light incident surface when the light beam from the light emitting surface is transmitted to the partially transmissive and partially reflective layer, and part of the light beam is reflected by the partially transmissive and partially reflective layer.

3. The backlight module according to claim 1, wherein the partially transmissive and partially reflective layer is disposed between the diffusion layer and the light incident surface; and part of the light beam passes through the partially transmissive and partially reflective layer and is transmitted to the light incident surface after the light beam from the light emitting surface passes through the diffusion layer, and part of the light beam is reflected by the partially transmissive and partially reflective layer and is transmitted back to the diffusion layer.

4. The backlight module according to claim 1, wherein the composite optical film covers an end of the light incident surface of the light guide plate.

5. The backlight module according to claim 1, wherein the composite optical film covers the entire light incident surface of the light guide plate.

6. The backlight module according to claim 1, wherein the diffusion layer comprises a plurality of diffusion particles, and the light beam is diffused by the diffusion particles when passing through the diffusion layer.

7. The backlight module according to claim 1, wherein the partially transmissive and partially reflective layer comprises a plurality of reflection particles, and part of the light beam is reflected by the reflection particles when the light beam is transmitted to the partially transmissive and partially reflective layer, and part of the light beam passes through the partially transmissive and partially reflective layer via a gap between the reflection particles.

8. The backlight module according to claim 1, further comprising a substrate and a reflective device, wherein the reflective device and the light emitting devices are disposed on the substrate, and the reflective device is located peripherally to the light emitting devices.

9. The backlight module according to claim 8, wherein the substrate has a device disposition surface, facing to the light incident surface of the light guide plate, and the light emitting devices are disposed on the device disposition surface of the substrate.

10. The backlight module according to claim 8, wherein the substrate has a device disposition surface, vertical to the light incident surface of the light guide plate, and the light emitting devices are disposed on the device disposition surface of the substrate.

11. The backlight module according to claim 1, wherein the light emitting devices comprises at least one of a red light emitting diode device, a green light emitting diode device, a blue light emitting diode device, and a white light emitting diode device.

12. The backlight module according to claim 1, further comprising a plurality of light scattering micro-structures, disposed on the bottom surface or the light exit surface of the light guide plate.

13. The backlight module according to claim 12, wherein a density of the light scattering micro-structures located on the bottom surface or the light exit surface of the light guide plate is gradually thickened in a direction away from the light incident surface.

14. The backlight module according to claim 12, wherein the light scattering micro-structures are evenly aligned on the bottom surface or the light exit surface of the light guide plate.

15. The backlight module according to claim 1, wherein the light guide plate has a thickness gradually thinned in a direction away from the light incident surface.

16. The backlight module according to claim 15, wherein the light guide plate is a wedge-shaped light guide plate.

17. The backlight module according to claim 1, further comprising a reflective sheet, disposed on the bottom surface of the light guide plate.

18. The backlight module according to claim 1, further comprising an optical film assembly, disposed on the light exit surface, and comprising at least one of a diffusion sheet, a prism sheet, and a brightness-enhanced sheet.

19. The backlight module according to claim 1, wherein the composite optical film comprises a plurality of diffusion layers and a plurality of partially transmissive and partially reflective layers, wherein one of the diffusion layers is closest to the light incident surface of the light guide plate.

20. The backlight module according to claim 1, wherein the composite optical film comprises a plurality of diffusion layers and a plurality of partially transmissive and partially reflective layers, wherein one of the partially transmissive and partially reflective layers is closest to the light incident surface of the light guide plate.

* * * * *